Nov. 10, 1936.  J. A. DUNLAP  2,060,366
ANIMAL CATCHER
Filed Oct. 18, 1935

Inventor
J. A. Dunlap

Patented Nov. 10, 1936

2,060,366

UNITED STATES PATENT OFFICE 2,060,366

ANIMAL CATCHER

John A. Dunlap, Moberly, Mo., assignor of forty-nine per cent to Carson Ray Lilly, Moberly, Mo.

Application October 18, 1935, Serial No. 45,677

3 Claims. (Cl. 119—154)

The device forming the subject matter of this application is a hog catcher, comprising a pair of movable jaws, and the invention aims to provide novel means for mounting and operating the jaws. A further object of the invention is to provide a novel construction whereby when a plunger is advanced, the jaws may be opened to receive the snout of a hog, or, at the will of an operator, be used to spread apart the jaws of an animal that is to be dosed with medicine, or for any other similar purpose.

It is within the province of the disclosure to improve generally and to enhance the utility of devices of that type to which the invention pertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
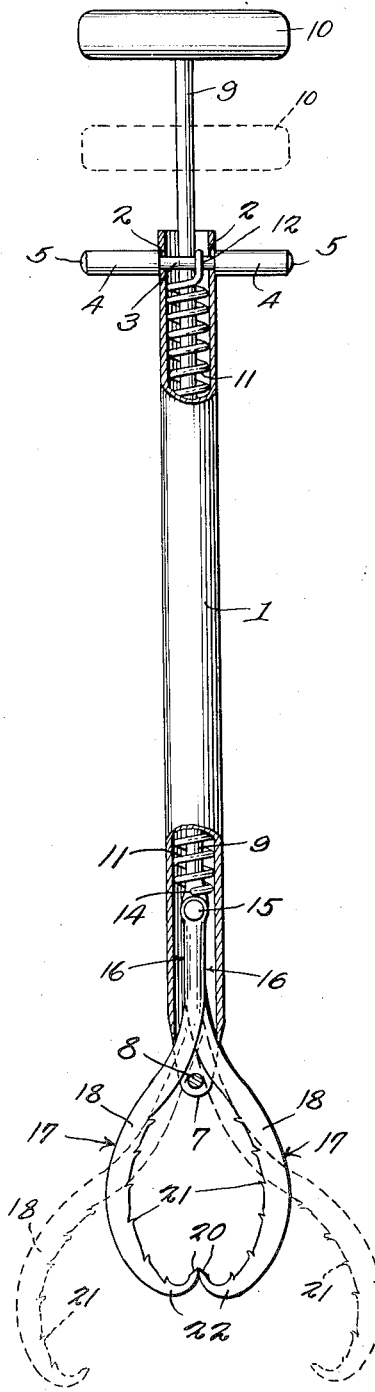
Fig. 1 shows in side elevation, an implement constructed in accordance with the invention, parts being broken away, and parts being in section.

The implement, for the most part, is made of metal. It comprises a tubular body 1, supplied near its upper end with oppositely disposed holes 2 into which may be slid a transverse rod 3, constituting a finger grip and spring anchor. Tubular grips 4, made of rubber, if desired, are placed on the end portions of the rod 3, the rod being headed at its ends 5, to hold the grips 4 on the rod 3, so that the rod cannot slide endwise out of the body 1. The grips 4 have two purposes, in that they keep the fingers of the operator firmly in place, and also keep the rod 3 in place in the body 1.

There are oppositely-disposed notches 6 in the lower end of the body 1, the notches forming depending ears 7 connected by a cross piece 8, such as a rivet, the rivet constituting a spreader for the jaws hereinafter mentioned.

A plunger 9 is mounted for longitudinal sliding movement in the body 1 and is provided at its upper end with a transverse hand rest 10. Here note that the plunger 9 slides to one side of the rod 3. It is unnecessary to make a hole in the rod 3 to receive the plunger 9, to provide a guiding cap on the body 1 for the plunger 9, or to resort to any similar construction, tending to increase cost. The simple straight rod 3, held in place by the grips 4 and the heads 5, is all that is required in this connection.

A pull spring 11 is slidable in the body 1, the upper end of the pull spring being connected at 12 to the rod 3. It is on this account that the rod 3 is called a spring anchor, as well as a finger grip. The lower end of the pull spring 11 is connected to the flattened lower end 27 of the plunger 9.

A pair of jaws 17 are provided, each jaw including an outwardly curved body 18, the jaws being broadened as shown at 19, near to their lower ends, each jaw having an inwardly and upwardly extended nose 20, the noses 20 being held in contact by the action of the spring 11 when the parts are in the position of Fig. 1. The end portions 22 of the jaws 17 extend inwardly, when the parts are arranged as shown in Fig. 1. The inner edges of the jaws 17 may be roughened to any desired extent, as shown at 21, to acquire a firm hold on the animal, without inflicting injury or causing unnecessary pain. The jaws 17 fit closely but slidably in the notches 6 of the body 1, between the ears 7, the jaws being disposed on opposite sides of the spreader 8. At their upper ends, the jaws 17 are supplied with straight portions 16, connected by a pivot element 15 with the flattened end 27 of the plunger 9, the parts 16 being on opposite sides of the flattened end 27 of the plunger.

The operation of the device is simple. The operator places the body 1 between his second and third fingers, those fingers being engaged with the grips 4, the rest 10 on the plunger 9 being seated against the palm of the operator's hand. The plunger 9 is advanced, against the action of the spring 11. The jaws 17 move downwardly, their curved and straight portions engage the spreader 8, and the jaws are opened to the dash line position of Fig. 1. The jaws 17 are straddled on the nose of the hog, or on any other part of its body, and when pressure on the rest 10 is relieved, the plunger 9 moves upwardly, under the impulse of the spring 11, and the nose of the hog is held between the jaws 17.

Figure 2:
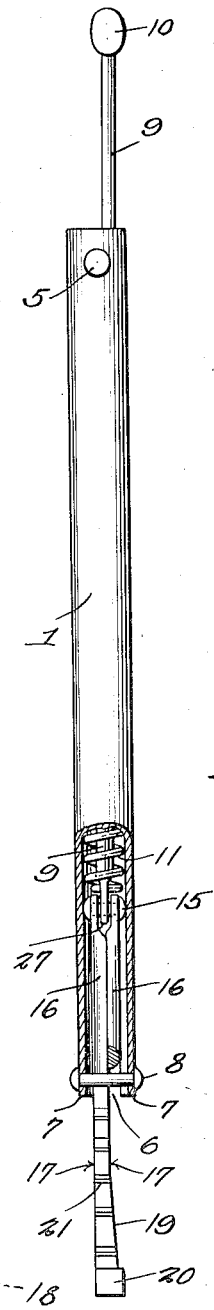
Fig. 2 is an elevation wherein the implement is viewed at right angles to the showing of Fig. 1.
Figure 3:
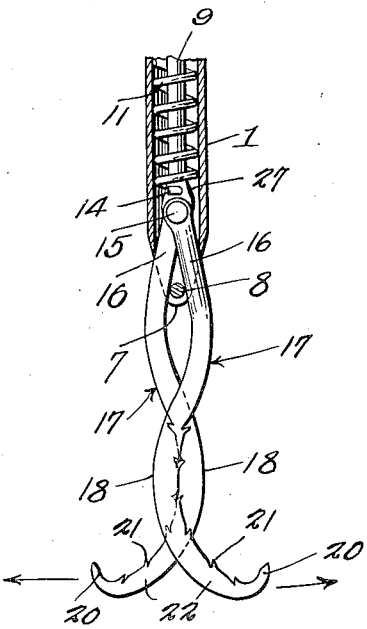
Fig. 3 is a longitudinal sectional view showing how the jaws may be arranged when it is proposed to use the implement for a purpose other than that depicted in Fig. 1.
Figure 4:
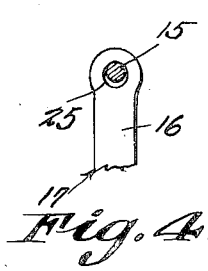
Fig. 4 is a fragmental elevation showing the mounting of the jaws.

An important feature of the invention will now be discussed. Referring to Fig. 4, it will be obvious that the holes 25 in the parts 16 of the jaws 17 that receive the pivot element 15 are a little larger in diameter than the diameter of the pivot element. This permits the jaws to have a lateral swinging movement with respect to each other, at right angles to the plane of the jaws in Fig. 1; although the jaws do not have any such lateral movement in the ordinary operation of the device, as hereinbefore explained, because the jaws fit closely but slidably in the notches 6 of the body 1, as Fig. 2 will show. If desired, however, the plunger 9 and the jaws 17 may be advanced a little from the position of Fig. 1, and the plunger 9 may be rotated on its axis. The jaws 17, bearing on the spreader 8, are reversed edge for edge, to the position of Fig. 3, such a reversal being possible because of the loose mounting of the jaws on the plunger 9, shown at 15—25 in Fig. 4. When the jaws are reversed as in Fig. 3, their curved parts 18 are crossed twice with respect to each other, the end portions 22—20 of the jaw then extending outwardly, instead of inwardly as shown in Fig. 1. When the jaws are in the position of Fig. 3, and when the plunger 9 is advanced, the jaws swing outwardly in the direction of the arrows in Fig. 3. The parts 22—20 are prominently presented at the sides of the implement and constitute a means whereby the jaws of an animal may be opened, to administer medicine, or whereby a veterinarian can spread the walls of an incision, during a surgical operation.

It will be seen that, by a simple but novel construction, the device embodies two instruments in one, a very simple operation being all that is required to shift the implement from one form to the other.

Having thus described the invention, what is claimed is:

1. In a device of the class described, a tubular body, a spreader at the lower end of the body, a transverse finger grip at the upper end of the body, a plunger slidable in the body, a palm rest at the upper end of the plunger, jaws extended into the lower end of the body, the spreader being disposed between the jaws, the upper ends of the jaws being pivoted to the lower end of the plunger, the finger grip and the palm rest constituting means whereby an operator may advance the plunger and open the jaws, and spring means housed in the body for retracting the plunger, the jaws then engaging the lower end of the body, to close the jaws, the spring means being a pull spring, having its lower end connected to the plunger, the upper end of the spring being connected to the finger grip, the finger grip extending through the body transversely, and the plunger being slidable between the intermediate portion of the finger grip and the adjacent portion of the body.

2. In a device of the class described, a tubular body having oppositely disposed openings near its upper end, a spreader at the lower end of the body, a transverse rod mounted in the openings and extended across the body, tubular finger grips on the outer ends of the rod and engaged at their inner ends with the body, to prevent the rod from shifting with respect to the body, means for holding the finger grips on the rod, a plunger slidable in the body, between the intermediate portion of the rod and the adjacent side of the body, a palm rest at the upper end of the plunger, jaws extended into the lower end of the body, the spreader being interposed between the jaws, the upper ends of the jaws being pivoted to the lower end of the plunger, the palm rest and the finger grips constituting means whereby an operator may advance the plunger and open the jaws by contact with the spreader, and spring means for retracting the plunger, to cause the jaws to close by engagement with the lower portion of the body.

3. A device of the class described comprising a body, a spreader in the lower end of the body, a plunger slidable longitudinally in the body and rotatable therein at the will of an operator, jaws disposed on opposite sides of the spreader and having inwardly extended lower ends, and means for pivoting the upper ends of the jaws so loosely to the lower end of the plunger that when the plunger is rotated, the jaws will be reversed edge for edge with respect to the spreader, the lower ends of the jaws then extending outwardly instead of inwardly.

JOHN A. DUNLAP.